(12) United States Patent
Chou

(10) Patent No.: US 10,657,788 B1
(45) Date of Patent: May 19, 2020

(54) PORTABLE LIGHTING AND WARNING DEVICE

(71) Applicant: Tien-Ming Chou, Taichung (TW)

(72) Inventor: Tien-Ming Chou, Taichung (TW)

( * ) Notice: Subject to any disclaimer, the term of this patent is extended or adjusted under 35 U.S.C. 154(b) by 0 days.

(21) Appl. No.: 16/406,308

(22) Filed: May 8, 2019

(30) Foreign Application Priority Data

Nov. 26, 2018 (TW) .............................. 107142020 A

(51) Int. Cl.
*G08B 21/00* (2006.01)
*G08B 21/10* (2006.01)
*G01V 1/00* (2006.01)
*H02J 7/35* (2006.01)

(52) U.S. Cl.
CPC ............. *G08B 21/10* (2013.01); *G01V 1/008* (2013.01); *H02J 7/35* (2013.01)

(58) Field of Classification Search
CPC ............ G08B 21/10; H02J 7/35; G01V 1/008
USPC ...................................................... 340/540
See application file for complete search history.

(56) References Cited

U.S. PATENT DOCUMENTS

| | | | |
|---|---|---|---|
| 2009/0133963 A1* | 5/2009 | Amano | B66B 5/022 187/247 |
| 2010/0081411 A1* | 4/2010 | Montenero | G08B 21/0233 455/404.2 |
| 2011/0199207 A1* | 8/2011 | Ikeda | G08B 25/007 340/540 |
| 2017/0184741 A1* | 6/2017 | Oto | G01V 1/30 |

* cited by examiner

*Primary Examiner* — Tanmay K Shah
(74) *Attorney, Agent, or Firm* — Thomas | Horstemeyer, LLP

(57) ABSTRACT

A portable lighting and warning device includes: a housing; a lighting generator unit; a sensor unit sensing shaking of the housing to generate a sense output; a mode selector unit generating a mode indication signal; a warning generator unit; and a controller unit. In a case where the mode indication signal indicates a lighting mode, the controller unit controls the lighting generator unit to emit light. In a case where the mode indication signal indicates a warning mode, the controller unit waits for a predetermined pause time, and then controls the warning generator unit and the lighting generator unit to output sound and emit light when the sense output corresponds to the shaking of the housing not less than a predetermined level in intensity.

12 Claims, 5 Drawing Sheets

PORTABLE LIGHTING AND WARNING DEVICE

CROSS-REFERENCE TO RELATED APPLICATION

This application claims priority of Taiwanese Patent Application No. 107142020, filed on Nov. 26, 2018.

FIELD

The disclosure relates to lighting and warning techniques, and more particularly to a portable lighting and warning device.

BACKGROUND

Referring to FIG. 1, Taiwanese Utility Model Patent No. M414589 discloses a conventional earthquake detecting device 1 that includes, among others, a sensing unit 11, a warning unit 12 which is operable to output sound and light, and a processing unit 13 which is coupled to the sensing unit 11 and the warning unit 12. The sensing unit 11 is adapted for sensing shaking of the conventional earthquake detecting device 1 due to, for example, earthquakes, and includes an accelerometer 111 and a gyroscope 112. The processing unit 13 receives signals generated by the accelerometer 111 and the gyroscope 112, uses extended Kalman filtering (EKF) to estimate intensity of the shaking based on the received signals, and controls the warning unit 12 to alert people by outputting sound and light when the estimated intensity exceeds a predetermined threshold.

However, movement of the conventional earthquake detecting device 1 from one location to another location will result in false warnings, and therefore it is only suitable to place the conventional earthquake detecting device 1 in a fixed location. In addition, the EKF, a rather complex calculation, requires the processing unit 13 to have high computation power, otherwise the conventional earthquake detecting device 1 would be overwhelmed by high calculation burden.

SUMMARY

Therefore, an object of the disclosure is to provide a portable lighting and warning device that can reduce false warnings.

According to the disclosure, the portable lighting and warning device includes a housing which houses a lighting generator unit, a sensor unit, a mode selector unit, a warning generator unit and a controller unit. The lighting generator unit is operable to emit light, and the warning generator unit is operable to output sound. The sensor unit senses shaking of the housing to generate a sense output. The mode selector unit generates a mode indication signal that indicates one of a plurality of modes which include a lighting mode and a warning mode, and is adapted to be actuated to change the mode indicated by the mode indication signal. The controller unit is coupled to the lighting generator unit, the sensor unit, the mode selector unit and the warning generator unit. The controller unit receives the sense output and the mode indication signal respectively from the sensor unit and the mode selector unit, and controls operations of the lighting generator unit and the warning generator unit based on the sense output and the mode indication signal. Under a circumstance where the mode indication signal indicates the lighting mode, the controller unit controls the lighting generator unit to emit light. Under a circumstance where the mode indication signal indicates the warning mode, the controller unit waits for a predetermined pause time, and then controls the warning generator unit and the lighting generator unit to output sound and emit light when the sense output corresponds to the shaking of the housing that has an intensity greater than or equal to a predetermined level.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
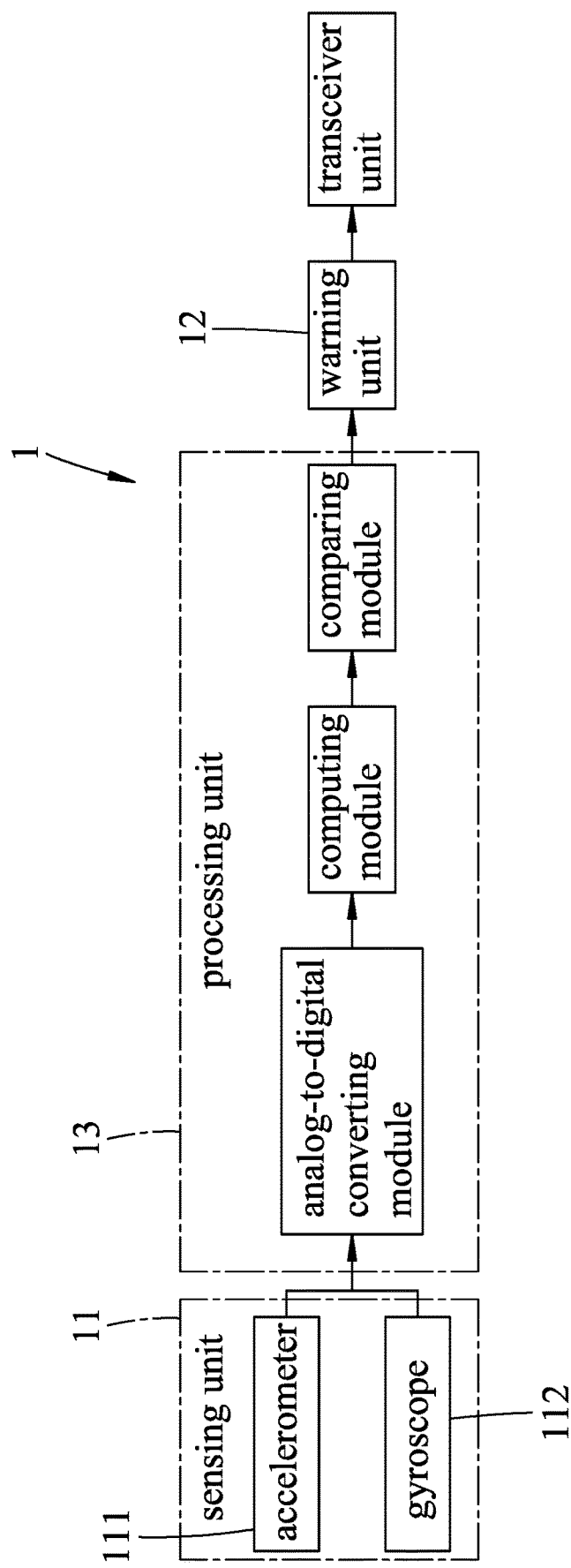
FIG. 1 is a block diagram illustrating a conventional earthquake detecting device.
Figure 2:
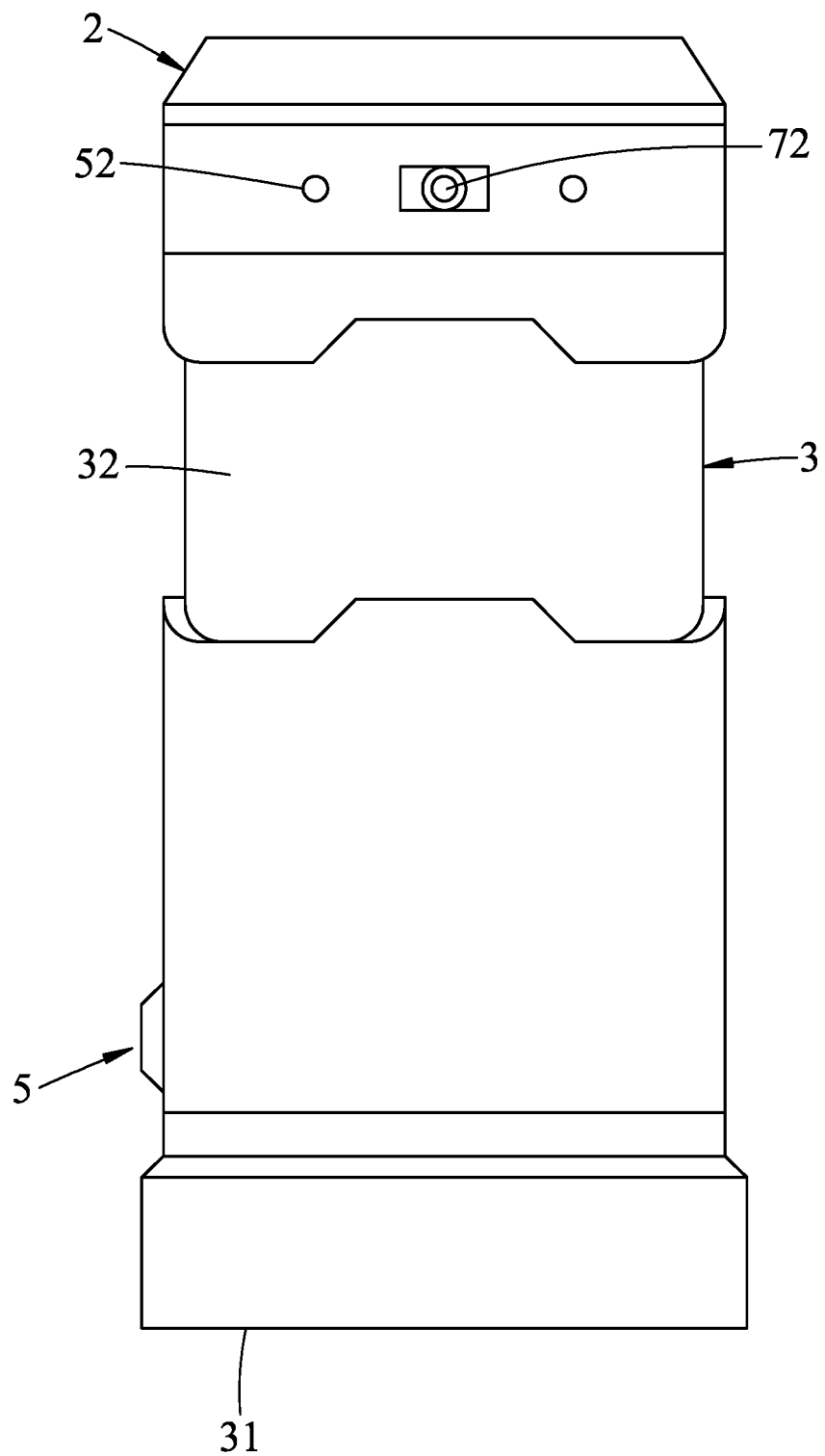
FIG. 2 is a front view of an embodiment of a portable lighting and warning device according to the disclosure.
Figure 3:
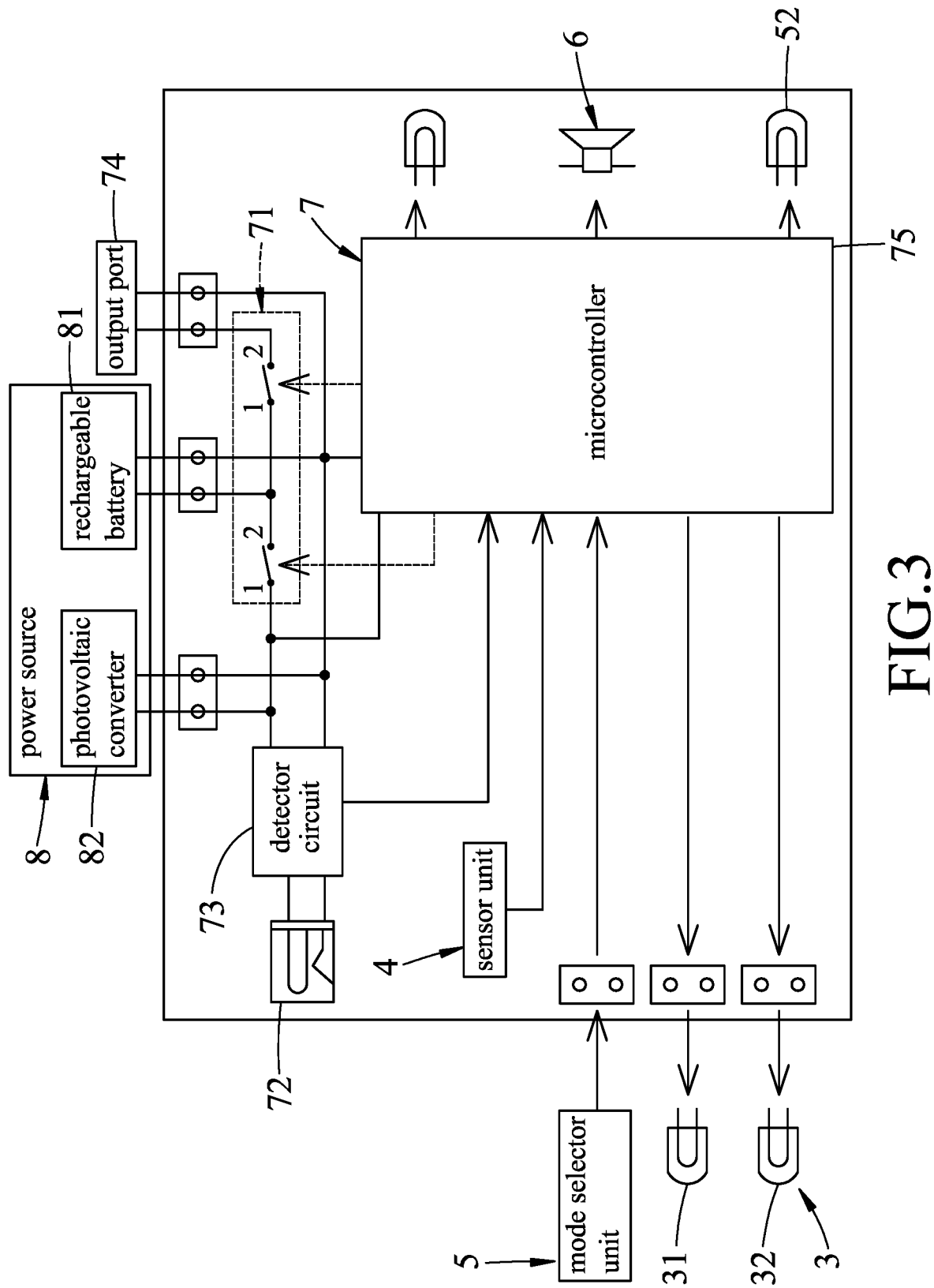
FIG. 3 is a circuit block diagram illustrating the embodiment.

Referring to FIGS. 2 and 3, an embodiment of a portable lighting and warning device according to the disclosure includes a housing 2, a lighting generator unit 3, a sensor unit 4, a mode selector unit 5, an indicator unit 52, a warning generator unit 6, a controller unit 7 and a power source 8.

In this embodiment, the housing 2 is rod shaped.

The lighting generator 3 is disposed in the housing 2, and is operable to emit light. In this embodiment, the lighting generator unit 3 includes a first lamp 31 that is exposed from an end surface of the housing 2, and a second lamp 32 that is exposed from a peripheral surface of the housing 2. In an example, each of the first and second lamps 31, 32 is a light emitting diode (LED) lamp.

Figure 4:
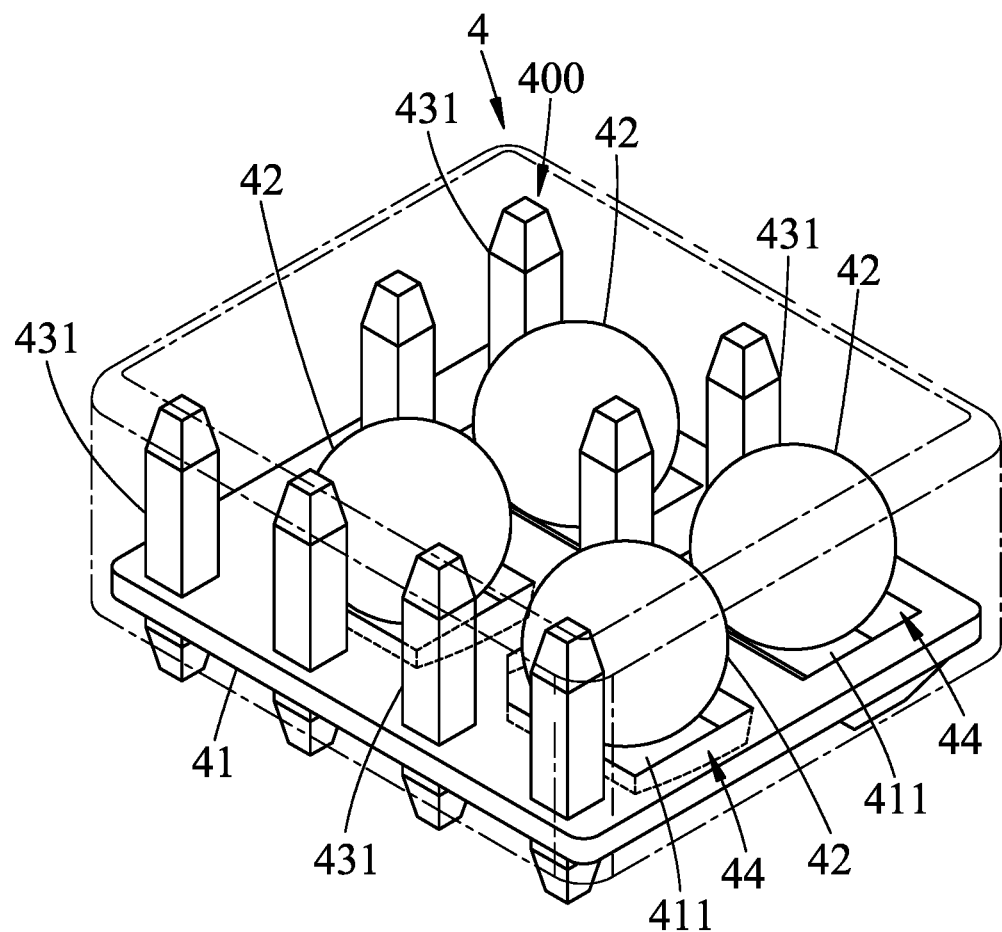
FIG. 4 is a perspective view of a tilt switch of the embodiment.
Figure 5:
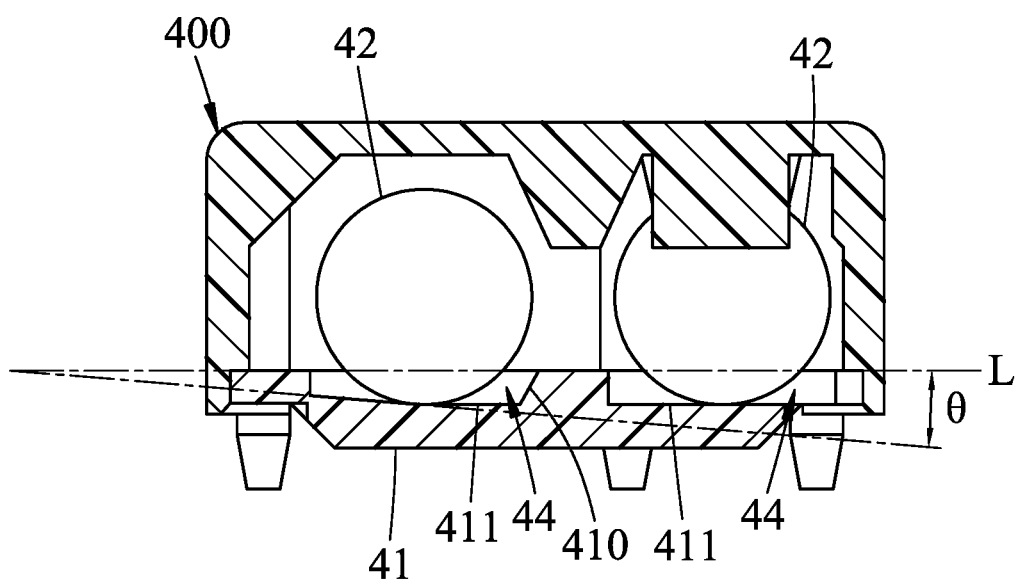
FIG. 5 is a sectional view of the tilt switch.

Referring to FIGS. 4 and 5, the sensor unit 4 is disposed in the housing 2 (see FIG. 2), and senses shaking of the housing 2 (e.g., due to earthquakes) to generate a sense output. In this embodiment, the sensor unit 4 includes a tilt switch 400, among others, and generates the sense output based on an operating state of the tilt switch 400. The tilt switch 400 includes a casing 41, a number (N) of conductive rolling elements 42 and a number (N) of pairs of conductive connecting terminals 431, where N 1. For illustrative purposes, N=4 in this embodiment. The casing 41 is formed with a number (N) (four in this embodiment) of recesses 44 at an inner bottom thereof. Each of the recesses 44 is defined by a side surface 410 and a bottom surface 411, where the bottom surface 411 is divided into a first part that slopes at an angle (θ) relative to a horizontal plane (L), and a second part that is parallel to the horizontal plane (L). The bottom surfaces 411 that define one half of the recesses 44 are perpendicular to the bottom surfaces 411 that define the other half of the recesses 44 in orientation. For each bottom surface 411, the first part has an upper end that is distal from the second part, and a lower end that is adjacent to the second part. For each of the conductive rolling elements 42, a respective one of the recesses 44 and a respective one of the pairs of conductive connecting terminals 431, the conductive rolling element 42 is accommodated in the recess 44, and the conductive connecting terminals 431 of the pair are beside the recess 44 and near the upper end of the first part of the bottom surface 411 that defines the recess 44. Therefore, the conductive rolling element 42 normally does not contact the conductive connecting terminals 431 of the pair, because it is normally distal from the upper end of the first part of the bottom surface 411 that defines the recess 44. In addition, the conductive rolling element 42 contacts the conductive connecting terminals 431 of the pair when it approaches the upper end of the first part of the bottom surface 411 that defines the recess 44 because of the shaking of the housing 2. The sense output includes a number (N) (four in this embodiment) of sense signals, each of which indicates whether a respective one of the conductive rolling elements 42 contacts the conductive connecting terminals 431 of one of the pairs that corresponds to the respective one of the conductive rolling elements 42.

Referring back to FIGS. 2 and 3, the mode selector unit 5 is disposed in the housing 2, generates a mode indication signal that indicates one of a plurality of modes (which include a shut down mode, a first lighting mode, a second lighting mode, a third lighting mode and a warning mode), and is adapted to be actuated to change the mode indicated by the mode indication signal. In this embodiment, the mode selector unit 5 is exposed from the peripheral surface of the housing 2, and the mode indication signal cyclically indicates the shut down mode, the first to third lighting modes and the warning mode in response to the actuations.

The indicator unit 52 is disposed in the housing, and is operable to emit light. In this embodiment, the indicator unit 52 is exposed from the peripheral surface of the housing 2.

The warning generator unit 6 is disposed in the housing 2, and is operable to output sound. In this embodiment, the warning generator unit 6 is a buzzer.

The controller unit 7 is disposed in the housing 2, and includes a switch circuit 71, an input port 72, a detector circuit 73, an output port 74 and a microcontroller 75. The input port 72 is exposed from the peripheral surface of the housing 2, and is adapted to be coupled to an alternating current (AC) adapter (not shown) for receiving direct current (DC) external electrical power that is generated by the AC adapter from AC mains electricity. The detector circuit 73 is coupled to the switch circuit 71 and the input port 72, and detects the receipt of the external electrical power by the input port 72. The output port 74 is coupled to the switch circuit 71, and is adapted to be coupled to an electronic device (not shown). The microcontroller 75 is coupled to the first and second lamps 31, 32, the sensor unit 4, the mode selector unit 5, the indicator unit 52, the warning generator unit 6, the detector circuit 73 and a common node of the switch circuit 71 and the detector circuit 73. In this embodiment, the output port 74 is a universal serial bus (USB) port.

The power source 8 is disposed in the housing 2, and includes a rechargeable battery 81 and a photovoltaic converter 82. The rechargeable battery 81 is coupled to the switch circuit 7. The photovoltaic converter 82 is coupled to the common node of the switch circuit 71 and the detector circuit 73, and is for converting light that illuminates thereupon into electrical power.

When the detector circuit 73 detects the receipt of the external electrical power by the input port 72, the microcontroller 75 controls the switch circuit 71 in such a way that the microcontroller 75 receives the external electrical power from the input port 72 via the detector circuit 73, and is powered by the external electrical power. When the detector circuit 73 does not detect the receipt of the external electrical power by the input port 72, the microcontroller 75 controls the switch circuit 71 in such a way that the microcontroller 75 receives electrical power from the rechargeable battery 81 via the switch circuit 71, and is powered by the electrical power received from the rechargeable battery 81.

In addition, the microcontroller 75 may control the switch circuit 71 in such a way that the switch circuit 71 receives at least one of the external electrical power or the electrical power generated by the photovoltaic converter 82, and outputs the received electrical power to charge the rechargeable battery 81.

Moreover, the microcontroller 75 may control the switch circuit 71 in such a way that the switch circuit 71 receives at least one of the external electrical power, the electrical power generated by the photovoltaic converter 82, or the electrical power provided by the rechargeable battery 81, and outputs the received electrical power at the output port 74 to power the electronic device.

Furthermore, the microcontroller 75 receives the sense output and the mode indication signal respectively from the sensor unit 4 and the mode selector unit 5, and controls operations of the first and second lamps 31, 32, the indicator unit 52 and the warning generator unit 6 based on the sense output and the mode indication signal.

Under a circumstance where the mode indication signal indicates the shut down mode, the microcontroller 75 controls the first and second lamps 31, 32 and the indicator unit 52 to not emit light, and controls the warning generator unit 6 to not output sound.

Under a circumstance where the mode indication signal indicates the first lighting mode, the microcontroller 75 controls the first lamp 31 to emit light, controls the second lamp 32 to not emit light, controls the indicator unit 52 to emit light in a first way, and controls the warning generator unit 6 to not output sound. For example, the indicator unit 52 cyclically performs the following actions: (a) flickering once at a rate of one per second; and (b) not emitting light for three seconds, but the disclosure is not limited thereto. Since the first lamp 31 is exposed from the end surface of the housing 2, the portable lighting and warning device of this embodiment can be carried by a user to serve as a flashlight.

Under a circumstance where the mode indication signal indicates the second lighting mode, the microcontroller 75 controls the first lamp 31 to not emit light, controls the second lamp 32 to emit light, controls the indicator unit 52 to emit light in a second way different from the first way, and controls the warning generator unit 6 to not output sound. For example, the indicator unit 52 cyclically performs the following actions: (a) flickering twice at a rate of one per second; and (b) not emitting light for three seconds, but the disclosure is not limited thereto. Since the second lamp 32 is exposed from the peripheral surface of the housing 2, the portable lighting and warning device of this embodiment can be hung in a tent to serve as a camping light.

Under a circumstance where the mode indication signal indicates the third lighting mode, the microcontroller 75 controls the second lamp 32 to not emit light, controls the indicator unit 52 to emit light in a third way different from the first and second ways, controls the warning generator unit 6 to not output sound, controls the first lamp 31 to not emit light when the detector circuit 73 detects the receipt of the external electrical power by the input port 72, and controls the first lamp 31 to emit light when the detector circuit 73 does not detect the receipt of the external electrical power by the input port 72. For example, the indicator unit 52 cyclically performs the following actions: (a) flickering three times at a rate of one per second; and (b) not emitting light for three seconds, but the disclosure is not limited thereto. Since the portable lighting and warning device of this embodiment automatically emits light when the external electrical power is absent, it can be used as an emergency light that works during an outage of the mains electricity.

Under a circumstance where the mode indication signal indicates the warning mode, the microcontroller 75 waits for a predetermined pause time (e.g., five seconds), and controls the warning generator unit 6 to discontinuously output sound for a predetermined number of times (e.g., beep three times) upon completion of the waiting so as to inform a user that the portable lighting and warning device of this embodiment is ready to detect earthquakes or the like, and that it is not suitable to move the portable lighting and warning device of this embodiment. Thereafter, the microcontroller 75 controls the second lamp 32 to not emit light, controls the indicator unit 52 to emit light in a fourth way different from the first to third ways, controls the warning generator unit 6 and the first lamp 31 to output sound and emit light for a predetermined warning time (e.g., thirty seconds) when the sense output corresponds to the shaking of the housing 2 that has an intensity greater than or equal to a predetermined level, and controls the warning generator unit 6 and the first lamp 31 to not output sound and not emit light when the sense output corresponds to the shaking of the housing 2 that has an intensity less than the predetermined level. For example, the indicator unit 52 cyclically performs the following actions: (a) flickering four times at a rate of one per second; and (b) not emitting light for three seconds, but the disclosure is not limited thereto.

It should be noted that the predetermined level is determined by the angle (θ) (see FIG. 5). Greater angle (θ) leads to greater predetermined level. In an example where the angle (θ) is in a range from 2° to 5°, the portable lighting and warning device of this embodiment can detect an earthquake having a Richter magnitude greater than or equal to four. In addition, the first to fifth ways may be different in at least one of the flicker frequency, the number of flickers or color, and are not limited to the examples described above.

It should also be noted that, in other embodiments, the sensor unit 4 may use a sensor other than the tilt sensor 400 (e.g., an accelerometer, a gyroscope or a magnetism sensor).

In view of the above, the portable lighting and warning device of this embodiment has the following advantages.

1. Since the portable lighting and warning device waits for the predetermined pause time before it can warn about the shaking of the housing 2 that has an intensity not less than the predetermined level, the false warnings can be reduced.

2. Since the microcontroller 75 obtains, based on the operating state of the tilt switch 400, whether the intensity of the shaking of the housing 2 is greater than or equal to the predetermined level, no complex calculations are required, and therefore the portable lighting and warning device has a rather low calculation burden.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. A portable lighting and warning device comprising:
   a housing;
   a lighting generator unit disposed in said housing, and operable to emit light;
   a sensor unit disposed in said housing, and sensing shaking of said housing to generate a sense output;
   a mode selector unit disposed in said housing, generating a mode indication signal that indicates one of a plurality of modes which include a first lighting mode and a warning mode, and adapted to be actuated to change the mode indicated by the mode indication signal;
   a warning generator unit disposed in said housing, and operable to output sound; and
   a controller unit disposed in said housing, and coupled to said lighting generator unit, said sensor unit, said mode selector unit and said warning generator unit, said controller unit receiving the sense output and the mode indication signal respectively from said sensor unit and said mode selector unit, and controlling operations of said lighting generator unit and said warning generator unit based on the sense output and the mode indication signal;
   under a circumstance where the mode indication signal indicates the first lighting mode, said controller unit controlling said lighting generator unit to emit light;
   under a circumstance where the mode indication signal indicates the warning mode, said controller unit
      waiting for a predetermined pause time, and then
      controlling said warning generator unit and said lighting generator unit to output sound and emit light when the sense output corresponds to the shaking of said housing that has an intensity greater than or equal to a predetermined level.

2. The portable lighting and warning device of claim 1, wherein, under the circumstance where the mode indication signal indicates the warning mode, said controller unit further controls said warning generator unit to discontinuously output sound for a predetermined number of times upon completion of the waiting.

3. The portable lighting and warning device of claim 1, wherein, under the circumstance where the mode indication signal indicates the warning mode, said controller unit controls said warning generator unit and said lighting generator unit to output sound and emit light for a predetermined warning time when the sense output corresponds to the shaking of said housing that has the intensity greater than or equal to the predetermined level.

4. The portable lighting and warning device of claim 1, further comprising an indicator unit that is disposed in said housing, that is coupled to said controller unit, and that is operable to emit light;
   wherein, under the circumstance where the mode indication signal indicates the first lighting mode, said controller unit further controls said indicator unit to emit light in a first way;
   wherein, under the circumstance where the mode indication signal indicates the warning mode, said controller unit further controls said indicator unit to emit light in a second way different from the first way.

5. The portable lighting and warning device of claim 4, wherein the first and second ways are different in at least one of flicker frequency, a number of flickers or color.

6. The portable lighting and warning device of claim 1, wherein:
the modes further include a second lighting mode;
said controller unit is for receiving external electrical power, and detects the receipt of the external electrical power thereby;
under a circumstance where the mode indication signal indicates the second lighting mode, said controller unit controls said lighting generator unit to not emit light when detecting the receipt of the external electrical power thereby, and controls said lighting generator unit to emit light when not detecting the receipt of the external electrical power thereby.

7. The portable lighting and warning device of claim 1, wherein:
said lighting generator unit includes a first lamp and a second lamp;
the modes further include a second lighting mode;
under the circumstance where the mode indication signal indicates the first lighting mode, said controller unit controls said first lamp to emit light;
under a circumstance where the mode indication signal indicates the second lighting mode, said controller unit controls said second lamp to emit light.

8. The portable lighting and warning device of claim 1, further comprising a power source that is disposed in said housing, and that includes:
a rechargeable battery coupled to said controller unit, and for powering said controller unit; and
a photovoltaic converter coupled to said controller unit, and for converting light that illuminates thereupon into electrical power;
wherein said controller unit is for receiving the electrical power generated by said photovoltaic converter, and is for outputting the electrical power generated by said photovoltaic converter to charge said rechargeable battery.

9. The portable lighting and warning device of claim 1, wherein said controller unit includes an output port, and is for outputting electrical power at said output port.

10. The portable lighting and warning device of claim 1, wherein said sensor unit includes a tilt switch, and generates the sense output based on an operating state of said tilt switch.

11. The portable lighting and warning device of claim 10, wherein said tilt switch includes:
a casing formed with a number (N) of recesses at an inner bottom thereof, where N≥1, each of the recesses being defined by a side surface and a bottom surface that slopes relative to a horizontal plane;
a number (N) of conductive rolling elements; and
a number (N) of pairs of conductive connecting terminals;
for each of said conductive rolling elements, a respective one of the recesses and a respective one of said pairs of conductive connecting terminals, said conductive rolling element being accommodated in the recess, said conductive connecting terminals of said pair being beside the recess and near an upper end of said bottom surface that defines the recess, and said conductive rolling element contacting said conductive connecting terminals of said pair when said conductive rolling element approaches said upper end of said bottom surface which defines the recess because of the shaking of said housing.

12. The portable lighting and warning device of claim 11, wherein the sense output includes a number (N) of sense signals, each of which indicates whether a respective one of said conductive rolling elements contacts said conductive connecting terminals of one of said pairs that corresponds to the respective one of said conductive rolling elements.

\* \* \* \* \*